Figure 2:
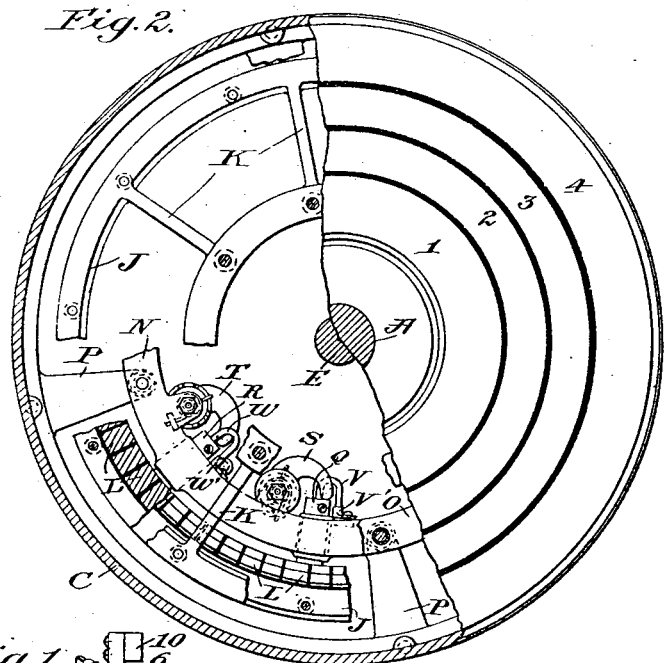

W. MORRISON.
POWER TRANSMISSION SYSTEM.
APPLICATION FILED AUG. 12, 1913.

1,126,059.

Patented Jan. 26, 1915.
3 SHEETS—SHEET 1.

Witnesses:
N. P. Leonard.
R. I. Hulsizer.

Inventors:
William Morrison
by Byrnes Townsend Brickenstein
Attys.

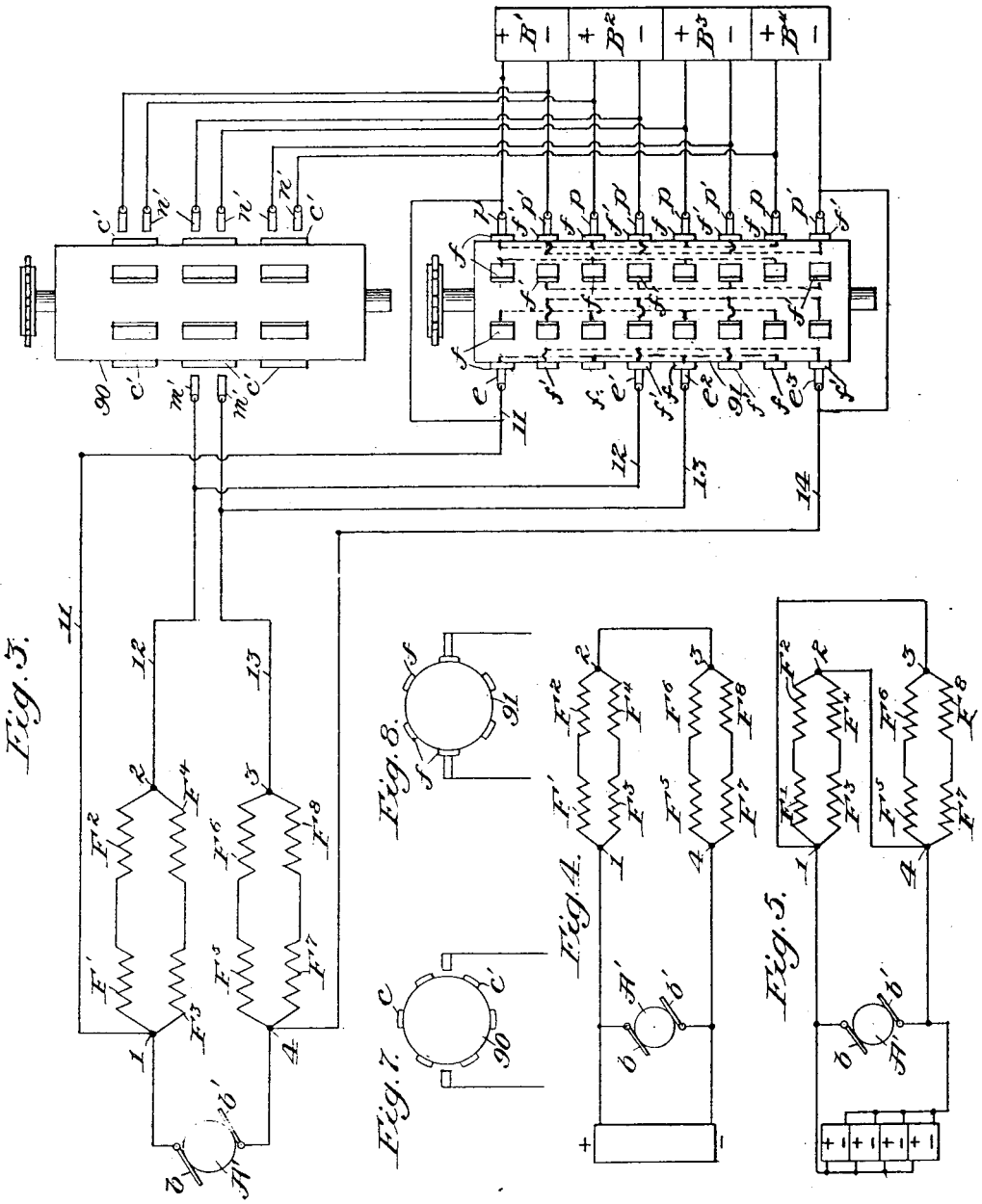

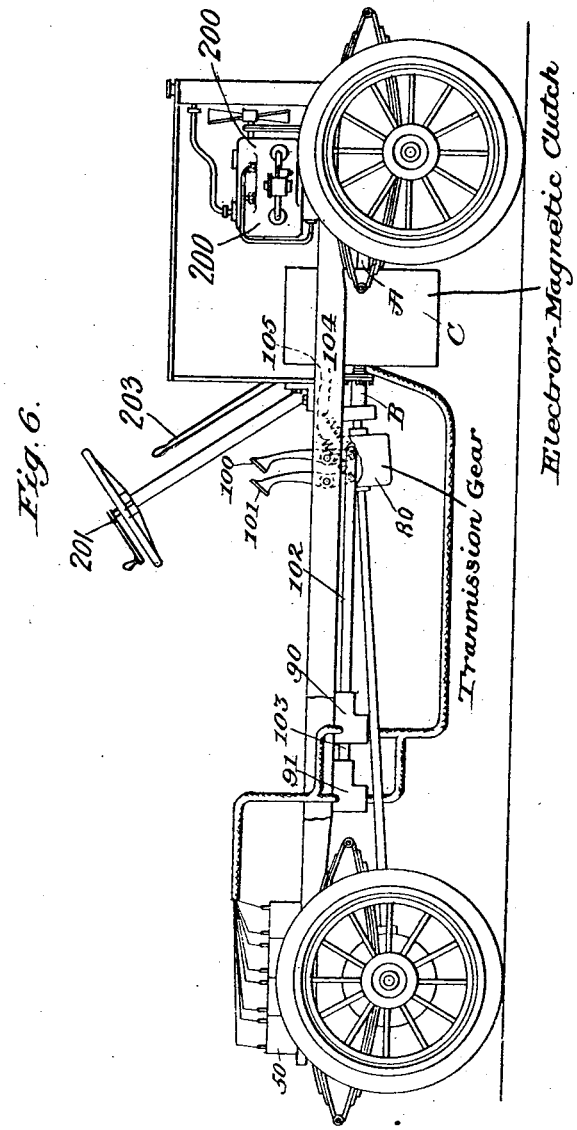

UNITED STATES PATENT OFFICE.

WILLIAM MORRISON, OF DES MOINES, IOWA.

POWER-TRANSMISSION SYSTEM.

1,126,059.  Specification of Letters Patent.  Patented Jan. 26, 1915.

Application filed August 12, 1913. Serial No. 784,458.

*To all whom it may concern:*

Be it known that I, WILLIAM MORRISON, a citizen of the United States, residing at Des Moines, in the county of Polk and State of Iowa, have invented certain new and useful Improvements in Power-Transmission Systems, of which the following is a specification.

My invention relates to a power-transmission system, capable of general application, but principally designed and applied to automobiles driven by variable speed gas-engines, in which system the power is transmitted from the gas-engine to the driven shaft through a dynamo-electric machine acting as a clutch, in such manner that but a small fraction of the power developed by the gas-engine is utilized in the clutch, the balance of the power being transmitted directly through the driven shaft.

My invention further provides a system in which the speed regulation of the automobile is effected, as in any ordinary gas-engine-driven automobile, by varying the speed of the engine, the dynamo acting in the main simply as an electromagnetic clutch, and generating only enough current, under normal running conditions, to produce the requisite clutching effect.

The requisite clutching effect is that which will couple the engine shaft to the driven shaft by a magnetic pull sufficient to enable the operation of the automobile under all normal speed conditions and under ordinary road conditions, but is not so great as to prevent a small speed variation between the driving and driven shafts under abnormal conditions. Thus the clutch has under normal running conditions all the effectiveness of a mechanical clutch, but is none the less capable of yielding to a limited degree when there are sudden increases in the load, such as occur momentarily during the starting and changing speeds or when the automobile strikes an obstacle or is otherwise suddenly retarded. The elements of my new dynamo-electric clutch are therefore designed to produce this requisite clutching effect, the current necessary to magnetize the rotary field magnet and rotary armature to the extent required being generated at the outset in the armature at a comparatively very small number of slip revolutions, the energy thus consumed in the clutch being, therefore, but a very small fraction of that developed by the gas-engine, all the remaining energy developed by the engine at speeds above that required for generating the clutching current being available for load-driving purposes.

My invention further relates to the combination with a dynamo-electric clutch of this kind, of a storage battery whose current is utilized for operating the dynamo as a motor to start the gas-engine, for operating incandescent lamps, sparking-coils, etc. For reasons which will later appear, it is highly desirable that during the operation of the dynamo as a clutching generator, this battery, which for starting purposes should be capable of furnishing a relatively high voltage, should have its cells or sets of cells arranged as far as possible in parallel to receive and deliver current at the lowest possible voltage. This voltage must correspond to the voltage of the incandescent lamps used for lighting, and may be, for example, from 2 to 8 volts. The armature of the dynamo is therefore wound with a large number of turns and in such manner that, with a small number of slip revolutions, it will generate current at a voltage substantially equal to that of the fully charged batteries when connected in the predetermined multiple relation. The field coils are so wound that at the voltage described there will be provided a sufficient number of ampere-turns to fully magnetize the cores and provide a powerful magnetic field, the size of wire on both armature and field being properly proportioned to safely carry the current. In practice it has been found best to use a multipolar dynamo-electric machine, both eight-pole and twelve-pole machines having been constructed and found to be efficient.

The construction and operation of a system embodying the invention will be apparent from the accompanying specification and drawings, in which,—

Figure 1:
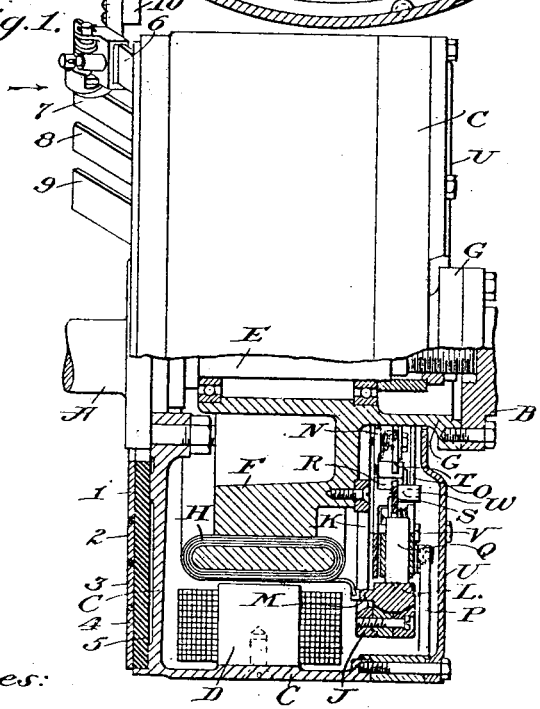

Figure 1 is a side view, partly in elevation and partly in section; Fig. 2 is a view looking from left to right in Fig. 1, portions being broken away to show details of construction; Figs. 3, 4 and 5 are circuit diagrams, for clearness only connections for a four-pole machine being shown; Fig. 6 is a schematic representation of my invention as applied to an automobile; Figs. 7 and 8 show the relative positions of the controller drums.

Referring to Fig. 1, A is the engine shaft and B the driven shaft, connected as shown in Fig. 6, through the usual speed-changing gears 80, to the driving gear of the automobile.

Secured to the shaft A is the open-ended drum C, which may be of cast steel, having secured to its inner face the field-magnet poles D, eight in number being indicated, although any other suitable number may be used.

Secured to or forming part of the shaft A is a stub-shaft E, on which is mounted, in ball-bearings, the armature F. To the flange G on the armature hub is secured, by any suitable means, the end of the automobile driving shaft B. For convenience of illustration, the armature has been shown with Gramme-ring windings H, though I may use a drum armature with the coils wound in slots of a laminated ring.

The commutator ring J is carried on a series of arms K bolted to the body of the armature. The commutator bars L are clamped into the ring and insulated therefrom in any desired manner. Each bar L has an inwardly projecting lug M to which the wires from the armature coils are connected. This commutator, it will be noted, has its brush-bearing surface on the inside, instead of the outside. This is advantageous, since the brushes carried on the rotating field-drum are forced outwardly by the centrifugal force and thereby held in firm contact with the commutator bars.

The brushes are carried on two rings, N and O, bolted to the inner ends of the arms P secured to the drum C. These rings are insulated from the arms P and from each other, and each carries in the particular machine shown, a series of four brushes Q, R. Adjustably spring-pressed arms S, T force the brushes outwardly. Wires V and W conduct current from the brushes to the terminals V' and W' mounted on their respective rings, each ring, in this particular case, carrying four brushes. These brush-carrying rings are connected to the proper collecting rings (to be referred to later) on the back of the drum C. The right-hand end of the drum is closed by a removable cover U, preferably made in two parts so as to be readily disengaged. Mounted on the back or closed end of the drum are a series of collector rings 1, 2, 3, 4, insulated from the drum by a layer 5 of insulating material. A series of brushes 6, 7, 8, 9 (only one being fully illustrated) are supported on a fixed part 10 of the frame of the automobile. From the brushes 6, 7, 8, 9 wires 11, 12, 13, 14 lead to two separately operated controllers 90, 91, the connections being diagrammatically shown in Fig. 3. The back end of the drum is covered by a casing (not shown).

90 is the engine-starting controller and 91 that used in the running position or that in which the dynamo is used as a clutch.

As shown, the field coils $F'$ to $F^8$ are connected in a series-multiple arrangement, those connections which remain fixed being made within the drum C, and the ends of the groups being connected to the rings 1, 2, 3 and 4. Obviously, groupings of the field coils other than those shown might be made.

The batteries are shown as comprising four units B, $B^2$, $B^3$, $B^4$, each of which may consist either of a single cell or a group of cells in series. Obviously, this particular number of units may be varied as varying conditions may demand.

The controller 91 consists of a drum of insulating material on the surface of which are arranged a number of longitudinal sets of separated contact blocks $f$ $f'$. As shown in Fig. 8, six sets may be used. Located to engage these contact blocks are a series of brushes $p$, $p'$, connected, as shown, to the positive and negative ends of the battery units, and a second set of brushes $e$, $e^1$, $e^2$, $e^3$ are connected to the conductors 11, 12, 13, 14. The blocks $f$ of each set are electrically connected, as shown in dotted lines, and the blocks $f'$ are similarly connected. As shown in Fig. 3, the circuits are closed to establish the relations shown in Fig. 5.

The connections may be traced (Fig. 3) as follows:—From armature brush $b$ to junction 1, coils $F^1$, $F^2$, $F^3$, $F^4$ to junction 2, wire 12, brush $e^1$ and its block $f$ through the controller connection to a lower block $f^1$, brush $e^2$, wire 14, junction 4, the armature brush $b^1$. At the same time, a circuit has been closed from junction 1, wire 11, brush $e$ and a block $f$, through controller-connections to a lower block $f$, brush $e^2$, wire 13, junction 3, coils $F^5$, $F^6$ and $F^8$, $F^7$, to junction 4. The battery units are also connected in multiple, and in shunt to the armature, their positive ends being connected together, through brushes $p$, blocks $f$ and controller connections, wire 11, junction 1 and brush $b$, while their negative ends are similarly, through brushes $p^1$, blocks $f^1$ and controller connections, connected together and to wire 14, junction 4 and brush $b^1$. The arrangement of circuits thus produced is diagrammatically shown in Fig. 5. The particular arrangement of circuit-controllers described is not essential to my invention, as any other form by which the circuits may be connected in the manner described, may be used.

The controller 90 consists of a drum of insulating material on the surface of which is arranged a number of longitudinal sets of separated contact blocks $c^1$. As shown in Fig. 7, six sets may be used. Located to engage these contact blocks is a series of brushes $n^1$, connected to the positive and negative ends of the battery units; and another set of brushes $m^1$ is connected to the conductors 12 and 13. The blocks $c^1$, $c^1$ are each wide enough to engage the brushes $m^1$, $m^1$, or $n^1$, $n^1$. As shown in Figs. 3 and 7, the engine-starting circuits are all open, none of the brushes being in engagement with the contact blocks. If, however, the drum is rotated one step, the brushes will rest on contact blocks and circuits will be closed to connect the batteries in series relation and the field coils in series relation. The arrangement of circuits thus produced is diagrammatically shown in Fig. 4, with the field coils connected in a series relation, and all the battery units in series. So connected, the battery is delivering current to the armature of the dynamo to operate it as an engine-starting motor, while in the arrangement shown in Figs. 3 and 5, the paralleled batteries are connected to the armature to oppose the flow of current therefrom.

It will be noted that the batteries and field coils are arranged in shunt to the armature, so that whether the dynamo-electric machine is acting as a generator or a motor, the direction of rotation of the armature is the same.

The controller drums may be operated by an escapement controller mechanism, which is described in my application, Serial No. 742,277, filed January 15, 1913. It will be sufficient for the purposes of this application to state that by downward pressure of the foot the controller-drum is rotated one step to close its circuits, and upon release of the pressure is given an additional step to open its circuits. The controllers may, of course, be operated by hand, or by any suitable mechanism.

As shown in Fig. 6, the controllers 90, 91 are operated by the foot-pedals 100, 101, pivoted on the frame of the machine and having connecting rods 102, 103. Retracting springs 104 and 105 are attached to the pedals in any suitable manner. Figs. 7 and 8 show the respective positions of the controller drums, one with circuits open when the circuits of the other are closed.

The operation of the system is as follows:—The engine is started by causing the controller 90 to connect the field circuits across the middle block $c'$, and, at the same time, the battery is coupled in series by the wires leading to the brushes $n'$, $n'$, as above described. The maximum voltage of the battery is therefore delivering current to the system, coupled as shown in Fig. 4, the dynamo-electric machine acting as a shunt-wound motor. As the automobile is at rest, preferably with the brakes applied, the armature connected to its driving shaft is held against rotation and the field-magnet rapidly rotates. The engine shaft is thereby also rotated and the engine started. The controller 90 is then rotated another step to break the connections above described. With the engine running, the brakes are released and the controller 91 is operated to bring the system into the condition shown in Fig. 5. As the field drum is now rotated by the engine, the dynamo-electric machine begins to act as a generator. As soon as the slip between the rotors is large enough, the requisite clutching current is generated. The engine may now be speeded up, and the armature is dragged around with the field, the dynamo acting as a clutch. All the power developed by this increased speed is then transmitted through the clutch to the driven shaft for driving the automobile, and the automobile is started without shock or jar. It will be noted that the current generated is used for clutching, and none of the electrical energy developed, is or can be otherwise used in driving the automobile. The automobile is then operated in the usual way, the speed being controlled by throttling the engine, advancing or retarding the spark, or changing the gears, as may be desired. As will appear from Fig. 6, the dynamo element attached to the engine-shaft acts as the flywheel of the engine. 200 is the engine, which may be either a steam- or gas-engine, and 201 is a throttle for controlling the supply of motive fluid to the engine.

203 is a lever for operating the change gear mechanism which may be of any desired type.

Under normal running conditions, the voltage at the brushes of the dynamo-clutch is equal to that of the fully-charged battery, so that no current is delivered to the battery, all the current generated in the armature flowing over the field circuit. If, however, for any reason, such as consumption of current in starting the engine, lighting, etc., the voltage of the battery is below the maximum, then part of the current generated by the slip will flow into and charge the battery, until the cells are again fully charged. For example, assuming that 6 volt lamps are used, the battery is arranged with sets of three cells in series, the sets being in multiple. When fully charged, the voltage at the terminals of each set is approximately 7½ volts, and as the dynamo is arranged to normally deliver current at this voltage, no current can flow into the battery, except upon the slight rise of voltage such as that due to a sudden pull. If, however, the cells are not fully charged, the voltage of the set might be, say, 6 volts, and current would flow into the batteries, this charging current being delivered, however, into all the paralleled sets of cells, so that the charging is effected at a relatively slow rate, which is highly desirable, as if charged too rapidly the life of the cells would be lessened. The use of a plurality of cells or sets of cells is, therefore, of advantage in two respects, viz., that sufficient voltage is provided, when the battery is arranged in series relation, to furnish a powerful engine-starting current, and that, when connected in multiple relation, they are charged under the best conditions.

In order that as little as possible of the power of the gas-engine may be wasted in the generation of current for clutching purposes, the dynamo-electric clutch should be designed in such a manner that the requisite clutching-effect is secured by a small number of slip-revolutions or relative rotations of the field and armature rotors.

This construction gives all the advantages of electric driven machines with all the flexibility of such machines while converting but a few revolutions of the prime mover into current to be used in clutching, the remainder of the revolutions of the prime mover being used in running the automobile on the roadway without being converted into electric current, thus avoiding the loss of such conversion. In short, my invention avoids the waste inevitable in any system in which the total effort of the gas-engine, or any large proportion of such total effort, is converted into electric energy. A dynamo-electric clutch of this kind is therefore capable of application to automobiles as now built, where there is no room for extra motor and generating sets, since a generator sufficient to produce the clutching effect is small in size. Moreover, a smaller gas-engine can be used to drive the car than would be necessary if the whole power developed by the gas-engine were converted into electrical energy to be used for running the car, since by my invention, only enough electrical energy is generated and used to produce the clutching-effect, the balance of the power of the gas-engine being transmitted, preferably through gears, to the driving shaft of the automobile.

In order properly to design the clutch for a given machine, as for example an automobile, it is necessary first to measure, experimentally, the electrical energy required for clutching expressed in watts. The voltage at which this required power is to be generated is then determined, the essential consideration being that it should be as low as practicable, consistent with the character of the lighting-system. The dynamo is then designed in accordance with the well-known principles to develop the required power at the determined voltage, with due regard to the provision of a practically saturated field. The armature of such a machine is wound with as many turns as practicable of wire of the proper current-carrying size, so that the necessary E. M. F. may be generated with the fewest practicable number of slip-revolutions; the field being as strong as practicable, or fully saturated. The field is wound with a sufficient length and size of wire to take, if necessary, the entire quantity of current generated by the armature to produce the required powerful clutching-effect; and the field coils are wound with such resistances as, when in shunt with the batteries, to take their required amount of current, so that the fields and batteries will each get their proper proportion.

The cells of the battery are, in the running position, arranged in parallel, in shunt with the fields, and this parallel arrangement is preferably the very lowest possible, i. e., with all the cells in parallel, as the slip needed to generate a voltage sufficient to overcome the two and one half volts E. M. F. of one lead storage cell, will then be reduced to the very smallest amount. In practice, it may be necessary to wind the armature for a higher voltage, say, that of two or three cells in series when lamps requiring a higher voltage are used, so that these lamps can be used while the machine is in operation; but the smallest parallel is much preferred, since the energy consumed in clutching is much less, as the relative difference of speed between the rotors may be less, and fewer revolutions of the engine are required to overcome the resistance of the low voltage cells. This method of connecting the cells in parallel is of further advantage in that when starting the automobile from rest with the engine still running, there is for a few seconds a larger quantity of current flowing from the electric clutch, and the batteries thus connected can take this excess current without danger of injury.

I have manufactured these clutching generators of the shunt, compound, and series types, but the shunt machine has the great advantage that there is no danger of reversal of the batteries, and no complicated regulating devices are required, which are hard to avoid in series machines. Moreover, in the shunt machine it is not necessary to generate the extra voltage to overcome the resistance of the battery and the resistance of the field in series, as is the case with the compound or series machine, and the two moving parts can run in much closer clutching relation and with much greater efficiency.

It is necessary to use a considerable number of cells in parallel when charging, since their combined voltage when connected in series is necessary to start the engine. As the clutch is wound to generate its clutching voltage at the fewest revolutions practicable, these few revolutions, when the dynamo acts as an engine-starting motor, would not be sufficient properly to start the gas-engine; and it is therefore necessary to use the batteries in series, when the dynamo is used as a motor, to develop sufficient power properly to start the engine. The voltage generated by the electric clutch when acting as a generator is practically constant at any speed of the gas engine or automobile.

By reason of the low resistance of the battery cells, a slight variation of voltage can cause a considerable variation of current-flow through the battery cells and somewhat of a variation in the fields.

Since the fields are shunt wound, and in fixed shunt relation with the armature and battery, and the field runs in the same direction as a dynamo or motor, it permits the battery to drop in and act as a brake whenever the slip drops below the generating point, acting just as it does when starting the engine.

If while the automobile is running the batteries are thrown in in series, as in the engine-starting position, instead of in parallel as in the running position a greater braking effect is produced, as under these conditions the battery tends to run the car backward and the engine forward, the clutch itself thus acting as an emergency brake.

A further advantage of my invention is that it permits the charging of the batteries without the aid of the usual regulating devices. Moreover, the flexibility of the clutch, as compared with the rigidity of a mechanical clutch, diminishes the cost of operation in that the engine operates without jar or strain, especially in starting or c' ang-ing speed, and at the same time and for a like reason, the wear of the tires is diminished.

A further advantage of this machine is the starting of the engine on the car without any "cranking," through this is by no means new. Nor is a two-part dynamo-electric generator with both elements revoluble new; nor is it new to use such a revolving generator operated by a gas-engine, for automobile-driving purposes, (see the description of my apparatus in the "Western Electrician," dated May 14, 1898, page 277). What is new is the construction of a flexible electric generating clutch, to generate only sufficient current to produce the clutching-effect, and to do this at substantially the low voltage of the batteries used for lighting the automobile, so that as few revolutions as practicable of the engine are lost in generating current for clutching. I believe that I am the first to apply one member of such a flexible electric clutch to a variable high speed gas-engine, and apply the other member to a driving shaft and utilize the power of the engine, except that consumed in the clutch, for the purpose of driving an automobile or other power-driven mechanism.

My invention permits the utilization of the whole power of the gas-engine through its whole range of speeds, in driving the load shaft, through gears or otherwise, except for the loss of the small fraction of the whole power lost in the clutch.

While I have shown the rotating field magnet connected to the gas-engine shaft, and the rotating armature to the driven shaft, this arrangement may be reversed.

I claim:—

1. In combination, a variable speed engine, a driving shaft connected thereto, a driven shaft connected to the load through variable power-transmitting devices, and a dynamo-electric generating clutch whereof the rotatable field and rotatable armature are connected one to said driving shaft and one to said driven shaft, said clutch constructed and arranged to generate at the outset and maintain at relatively low slip speeds an amount of current sufficient for the clutching action, the energy developed by the engine above that required for clutching being available for transmission through the clutch to the driven shaft.

2. In combination, a variable speed engine, a driving shaft connected thereto, a driven shaft connected to the load through variable power-transmitting devices, a dynamo-electric generating clutch whereof the rotatable field and rotatable armature are connected one to said driving shaft and one to said driven shaft, and a storage battery having its respective poles connected to like poles of the armature, said clutch constructed and arranged to generate at the outset and maintain at relatively low slip speeds an amount of current sufficient for the clutching action, the energy developed by the engine above that required for clutching being available for transmission through the clutch to the driven shaft.

3. In combination, a variable speed engine having means for varying the speed, an engine shaft, a driven shaft, a dynamo-electric clutch having revoluble field and armature elements, one connected to the engine shaft and the other connected to the driven shaft, the driven shaft connected to the load through variable power-transmitting devices, and a storage battery having its respective poles connected to like poles of the armature, said clutch constructed and arranged to generate at the outset, and maintain at relatively low slip speeds and at substantially the battery voltage, current sufficient to produce the full clutching effect desired, the power thus consumed in the clutch being but a small portion of the load-driving power of the engine.

4. The combination with an automobile, of a high speed gas engine and means for varying its speed, an engine shaft, a driven shaft and a dynamo-electric clutch consisting of a dynamo having revoluble field and armature elements, one connected to the engine shaft and the other to the driven shaft, variable reduction gears connecting the driven shaft to the load and means for changing said gears, the dynamo being so constructed that but a small number of the working revolutions of the gas engine are needed to produce the clutching effect, the energy developed at higher speed being available for transmission through the clutch and the reduction gears to drive the automobile.

5. The combination with an automobile of a high speed gas-engine and means for varying its speed, an engine shaft, a driven shaft, a dynamo-electric clutch consisting of a shunt-wound dynamo having revoluble field and armature elements, one connected to the engine shaft and the other to the driven shaft, a low voltage battery having its respective poles connected to like poles of the armature, the dynamo being so constructed that at a small number of slip revolutions a current sufficient to produce the requisite clutching effect will be generated at voltage substantially equal to that of the battery.

6. The combination with an automobile, of a high speed gas engine and means for varying its speed, an engine shaft, a driven shaft, a dynamo-electric clutch consisting of a dynamo having revoluble field and armature elements, one connected to the engine shaft and the other to the driven shaft, variable reduction gears connecting the driven shaft to the load, a low-voltage battery having its respective poles in unchanged relation to like poles of the armature, the dynamo being so constructed that at a small number of slip revolutions current sufficient to produce the requisite clutching effect will be generated at voltage substantially equal to that of the battery.

7. In combination, a variable speed engine, a driving shaft connected thereto, a driven shaft, and a dynamo-electric clutch whereof the rotatable field and rotatable armature are connected one to said driving shaft and one to said driven shaft, said clutch constructed and arranged to generate at the outset and maintain, at relatively low slip speeds, an amount of current sufficient for the clutching action, the energy developed by the engine above that required for clutching being available for transmission through said clutch to said driven shaft.

8. In combination, a variable speed engine, a driving shaft connected thereto, a driven shaft, a dynamo-electric clutch whereof the rotatable field and rotatable armature are connected one to said driving shaft and one to said driven shaft, and a low-voltage battery having its respective poles connected to like poles of the armature, said clutch constructed and arranged to generate at the outset and maintain at relatively low slip speeds, an amount of current sufficient for the clutching action, the energy developed by the engine above that required for clutching being available for transmission through said clutch to said driven shaft.

9. The combination with an automobile of a high speed gas-engine and means for varying its speed, an engine shaft, a driven shaft, a dynamo-electric clutch consisting of a shunt-wound dynamo having revoluble field and armature elements, one connected to the engine shaft and the other to the driven shaft, variable reduction gears connecting the driven shaft to the load, field coils arranged to be connected in series or multiple relation, a battery comprising a plurality of cells, means for connecting the cells and coils each in a series relation for operation of the dynamo as an engine starting motor and separate means for connecting the cells and coils, each in a multiple relation, the armature, field coils and cells being so proportioned that when in multiple relation current will be generated by a relatively small slip at voltage substantially equal to that of the battery and sufficient to produce the requisite clutching effect.

10. A power transmission system comprising a variable speed engine having means for varying the speed, an engine shaft, a load shaft, a dynamo-electric clutch consisting of a shunt-wound dynamo having revoluble field and armature elements, one connected to the engine shaft and the other to the load-shaft, variable reduction gears connecting the load-shaft to the load, the clutch constructed and arranged to generate, by a small number of slip revolutions and at substantially fixed voltage, current sufficient to produce the full clutching effect desired, the power thus consumed in the clutch being but a small portion of the load-driving power of the engine.

11. A power transmission system comprising a variable speed gas engine having means for varying the speed, an engine shaft, a load shaft, means for starting the gas-engine, a dynamo-electric clutch consisting of a shunt-wound dynamo having revoluble field and armature elements, one connected to the engine shaft and the other to the load-shaft, means for making and breaking the dynamo circuits, the clutch constructed and arranged to generate, by a small number of slip revolutions and at substantially fixed voltage, current sufficient to produce the full clutching effect desired, the power thus consumed in the clutch being but a small portion of the load-driving power of the engine.

12. The combination with an automobile of a high speed gas-engine and means for varying its speed, an engine shaft, a driven shaft, a dynamo-electric clutch consisting of a shunt-wound dynamo having revoluble field and armature elements, one connected to the engine shaft and the other to the driven shaft, a low voltage battery having its respective poles connected to like poles of the armature, the dynamo being so constructed that at a small number of slip revolutions a current sufficient to produce the requisite clutching effect will be generated at voltage substantially equal to that of the battery, and means for making and breaking the dynamo circuit.

13. A power transmission system comprising a variable speed engine having means for varying the speed, an engine shaft, a load shaft, a dynamo-electric clutch consisting of a shunt-wound dynamo having revoluble field and armature elements, one connected to the engine shaft and the other to the load-shaft, the clutch constructed and arranged to generate, by a small number of slip revolutions and at substantially fixed voltage, current sufficient to produce the full clutching effect desired, and means for making and breaking the dynamo circuit.

14. The combination with an automobile, of a high speed gas engine and means for varying its speed, an engine shaft, a driven shaft and a dynamo-electric clutch having revoluble field and armature elements, one connected to the engine shaft and the other to the driven shaft, variable reduction gears connecting the driven shaft to the load and means for changing said gears, means for starting the gas engine, and means for closing the dynamo circuit, the dynamo being constructed and arranged to generate at the outset and maintain at relatively low slip speeds an amount of current sufficient for the clutching action.

15. The method of transmitting power from a variable speed driving shaft to a driven shaft through a dynamo-electric clutch consisting of a rotatable armature and a rotatable field magnet, one connected to the driven shaft and the other to the driving shaft, which consists in generating at the outset and at low-slip speed current sufficient to produce the requisite clutching action, such clutching action between the field magnet and armature being maintained thereafter always at low-slip speeds and without substantial variation of difference of speed between driving and driven shafts, and varying the speed of the driven shaft by varying the speed of the driving shaft.

In testimony whereof I affix my signature in presence of two witnesses.

WILLIAM MORRISON.

Witnesses:
Jos. H. Blackwood,
N. P. Leonard.